(12) United States Patent
Baeck et al.

(10) Patent No.: US 7,142,077 B2
(45) Date of Patent: Nov. 28, 2006

(54) TWO-AXIS ACTUATOR WITH LARGE STAGE

(75) Inventors: Kyoung-lock Baeck, Busan-si (KR); Jong-up Jun, Ulsan-si (KR); Ju-hwan Jung, Seoul (KR); Seung-bum Hong, Gyeonggi-do (KR); Dong-ki Min, Seoul (KR); Hong-sik Park, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 10/922,140

(22) Filed: Aug. 20, 2004

(65) Prior Publication Data

US 2005/0040919 A1    Feb. 24, 2005

(30) Foreign Application Priority Data

Aug. 22, 2003    (KR) ............... 10-2003-0058285

(51) Int. Cl.
*H01H 51/22*    (2006.01)
(52) U.S. Cl. ............... 335/78; 200/181; 335/220
(58) Field of Classification Search ............... 335/78, 335/220–229; 200/181
See application file for complete search history.

(56) References Cited

U.S. PATENT DOCUMENTS

| | | | |
|---|---|---|---|
| 5,536,988 | A | 7/1996 | Zhang et al. |
| 6,445,107 | B1 * | 9/2002 | Jeong et al. ............... 310/309 |
| 6,445,514 | B1 | 9/2002 | Ohnstein et al. |
| 6,587,408 | B1 | 7/2003 | Jacobson et al. |
| 6,845,669 | B1 * | 1/2005 | Acar et al. ............... 73/504.14 |
| 2002/0136485 | A1 * | 9/2002 | Reed et al. ............... 385/18 |
| 2005/0099665 | A1 * | 5/2005 | Lee et al. ............... 359/213 |

OTHER PUBLICATIONS

Fedder G K: "Integrated microelectromechanical systems in conventional CMOS", Circuits and Systems. 1997. ISCAS '97., Proceedings of 1997 IEEE International Sysmposium on Hong Kong Jun. 9-12, 1997, New York, NY, USA, IEEE, US, vol. 4, Jun. 9, 1997, pp. 2821-2824, XP010236316.

Xie H et al: "Vertical comb-finger capacitive actuation and sensing for CMOS-MEMS", Sensors and Actuators A, Elsevier Sequoia S.A. Lausanne, CH, vol. 95, No. 2-3, Jan. 1, 2002, pp. 212-221, XP004377894.

Fan L S et al: "Integrated multilayer high aspect ratio milliactuators", Sensor and Actuators A, Elsevier Sequoia S.A. Lausanne, CH, vol. 48, No. 3, May 30, 1995, pp. 221-227, XP004303607.

* cited by examiner

*Primary Examiner*—K. Lee
*Assistant Examiner*—Bernard Rojas
(74) *Attorney, Agent, or Firm*—Sughrue Mion, PLLC

(57) ABSTRACT

A two-axis actuator having a large stage area and including includes a substrate, an anchor unit having sides approximately in a rectangular shape, fixed on the substrate, a plurality of first actuating parts actuating in a first direction and separated from the substrate within regions of both sides of the anchor unit, a plurality of second actuating parts actuating in a second direction between the first actuating parts, a rectangular shaped stage that actuates in the second direction, disposed above the second actuating parts, a third actuating part formed on the first actuating part, and elevated at a predetermined distance from the stage and the anchor unit, first direction deformable springs that support the first actuating part in inner parts of the anchor unit, and second direction deformable springs formed to fix the second actuating part in an inner part of the third actuating part.

21 Claims, 10 Drawing Sheets

TWO-AXIS ACTUATOR WITH LARGE STAGE

This application claims priority from Korean Patent Application No. 2003-58285 filed on Aug. 22, 2003, in the Korean Intellectual Property Office, the disclosure of which is incorporated herein in its entirety by reference.

BACKGROUND OF THE INVENTION

1. Field of the Invention

The present invention relates to a two-axis actuator, and more particularly, to an X-Y stage micro-actuator for use in a data storing system employing a Scanning Probe Microscope (SPM) technique.

2. Description of the Related Art

A data storing system that uses scanning probe microscope (SPM) techniques generally includes a medium as information storage, an actuator for moving the medium in the X-Y directions on a stage, at least one probe having tips for recording information on the medium or for reading information from the medium, and a signal processor for processing information signals.

The multiple probes can read or record multiple information at the same time, and for this purpose, the tip of each probe must approach the medium. Therefore, the probe needs an actuator and a sensor. The actuator deforms the probe in the Z direction so that the tip of the probe can approach to the medium. Then, the sensor reads information on the medium by sensing the deformation of the probe that moves along the medium.

For two-axis actuation, an actuator needs at least three electrodes in case of unidirectional actuation and at least five electrodes in case of bidirectional actuation. According to U.S. Pat. No. 5,536,988, an actuating part having multiple electrodes in one silicon structure can be achieved by insulating a selected region using thermal oxidation. However, this approach requires a very complicated process.

In U.S. Pat. No. 6,445,107, a single stage micro-actuator capable of actuating in two axes while using one electrode, is disclosed to solve the above-mentioned problem.

However, the actuators in the above patents have the drawback of stage inefficiency. The stage for locating the medium is at the same plane as the actuator for generating an electrostatic force, thereby decreasing the information storage capacity due to a narrow stage area.

SUMMARY OF THE INVENTION

An aspect of the present invention may provide a two-axis actuator that can remarkably increase information storage capacity through increasing the area of a stage by forming the stage separately on the actuator.

Another aspect of the present invention may provide a two-axis actuator having a large stage area, without a coupling problem during two-axis actuation.

According to a first exemplary embodiment of the present invention, there is provided a two-axis actuator comprising: a substrate; and an anchor unit fixed on the substrate, the anchor unit having approximately rectangular sides. The anchor unit has first sides facing each other, extending in a first direction, and having a plurality of corresponding discrete portions. The first actuating parts are formed in regions adjacent to second sides of the anchor unit extending in a second direction orthogonal to the first direction to actuate in the first direction, and the second actuating parts are installed a predetermined distance above the substrate, and are formed between the first actuating parts in a region adjacent to the first sides of the anchor unit extending in the first direction, wherein the second actuating parts are moveable in the second direction.

The stage of a rectangular shape is disposed on the second actuating parts to actuate in the second direction.

The third actuating part is separately disposed between the stage and the anchor unit. Parts of the third actuating part are formed on the first actuating parts, as one body to move the stage in the first direction by a movement of the first actuating parts.

The actuator further comprises first direction deformable springs, formed at inner faces of the anchor unit for the first actuating parts to move in the first direction; and second deformable springs formed at inner faces of the third actuating part for the second actuating parts to move in the second direction.

The first actuating parts may comprise a plurality of first actuating frames installed at a predetermined height from the substrate, upper parts of which are connected to the third actuating part, and disposed in parallel to the second sides of the anchor unit extending in the second direction. The first actuating parts may further comprise a plurality of first fixed frames disposed alternately with and in parallel to the first actuating frames.

A plurality of first actuating comb electrodes extend from the first actuating frames toward the corresponding first fixed frames; and a plurality of first fixed comb electrodes are disposed alternately with and in parallel to the actuating comb electrodes and extend from the first fixed frames.

The first direction deformable springs may connect the ends of the first actuating frames to the first sides of the anchor unit extending in the first direction. The first direction deformable springs may also connect the first sides of the anchor unit to outer sides of the third actuating part.

The two axes actuator may further comprise first main frames that connect centers of the first actuating frames adjacent to the sides of the anchor unit in the second direction, wherein the first fixed frames are disposed on both sides of the first main frames adjacent to the second sides of the anchor unit.

The second actuating parts may comprise a plurality of second fixed frames disposed in parallel to the first sides of the anchor unit extending in the first direction; second main frames, each connecting centers of the second fixed frames, adjacent to the first sides of the anchor unit extending in the first direction, and an end of each of which is extended toward a first side of the anchor unit extending in the first direction; first fixing beams, each connected to an end of a second main frame, an upper part of each of which is connected to the third actuating part; a plurality of second actuating frames disposed alternately with and parallel to the second fixed frames on both sides of the second main frames, upper parts of which are connected to the stage; and third main frames, connected to outer ends of the second actuating frames;

A plurality of second actuating comb electrodes extend from the second actuating frames toward corresponding second fixed frames; and a plurality of second fixed comb electrodes are disposed alternately with and in parallel to the second actuating comb electrodes and extend from the second fixed frames.

The second direction deformable springs may be formed between the stage and the third actuating part.

The two axes actuator can further comprise second fixing beams disposed a predetermined distance outward from the third main frames, an upper part of each of which is connected to the third actuating part, wherein the second direction deformable springs are formed between the second fixing beams and the third main frames.

Also, the two axes actuator can further comprise first direction deformable springs between the first fixing beams and corresponding first sides of the anchor unit extending in the first direction.

The two axes actuator can further comprise second direction deformable springs to connect ends of the first main frames to a corresponding third main frame.

A plurality of openings may be formed in the third actuating part.

According to a second exemplary embodiment of the present invention, the first actuating part comprises: a plurality of first fixed frames disposed on the substrate, parallel to the second sides of the anchor unit extending in the second direction; and a plurality of first actuating frames installed at a predetermined height from the substrate, upper parts of each of which are connected to the third actuating part, and which are disposed alternately with and in parallel to the first fixed frames.

A plurality of actuating comb electrodes extend from the first actuating frames toward corresponding first fixed frames; and a plurality of fixed comb electrodes are disposed alternately with and in parallel to the actuating comb electrodes and extend from the first fixed frame.

The two axes actuator may further comprise second fixing beams connected to outer ends of the second frames frame under the third actuating part.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
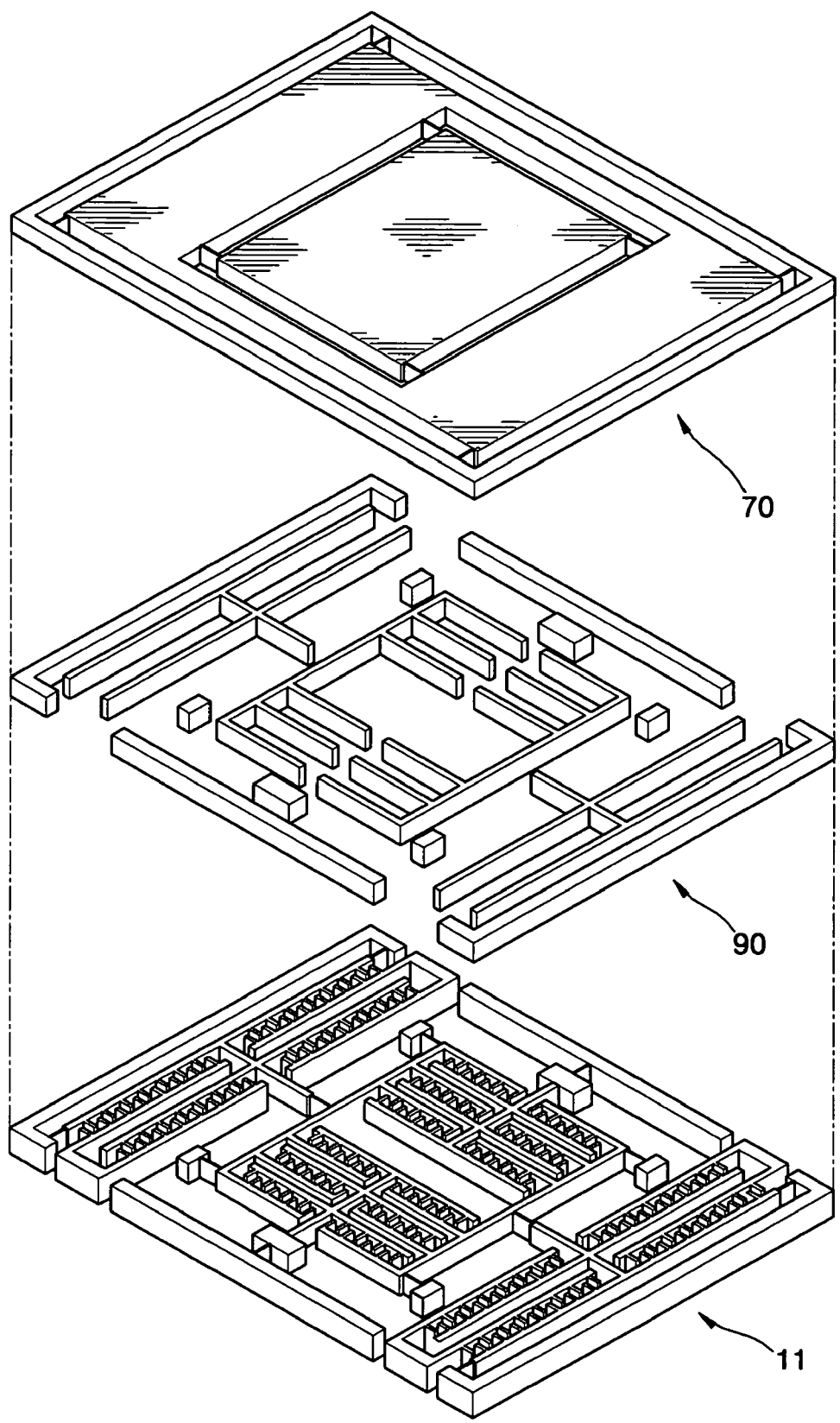
FIG. 1 is an exploded perspective view of a two-axis actuator according to a first exemplary embodiment of the present invention.
Figure 2:
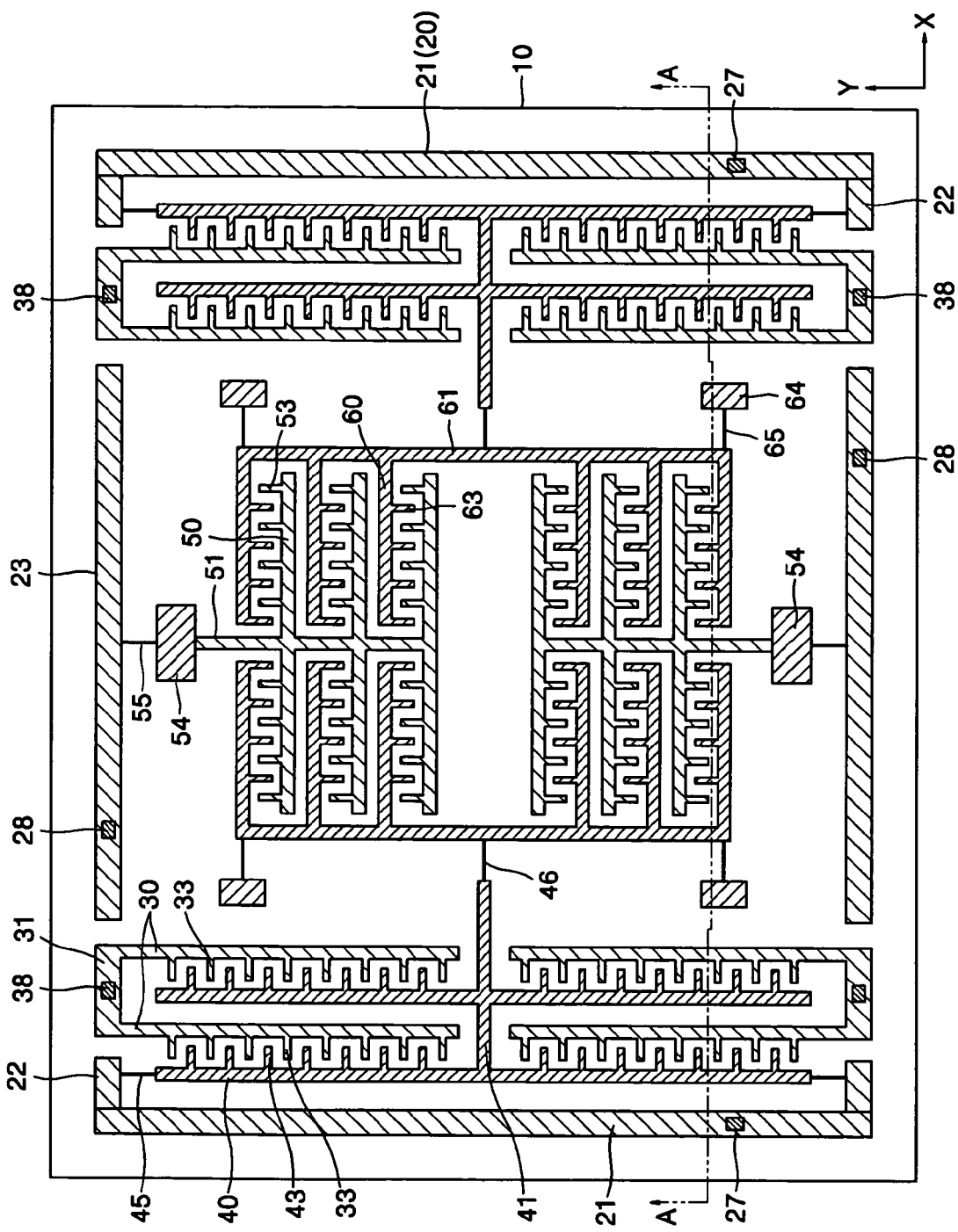
FIG. 2 is a perspective plan view of the two-axis actuator of FIG. 1.
Figure 3:
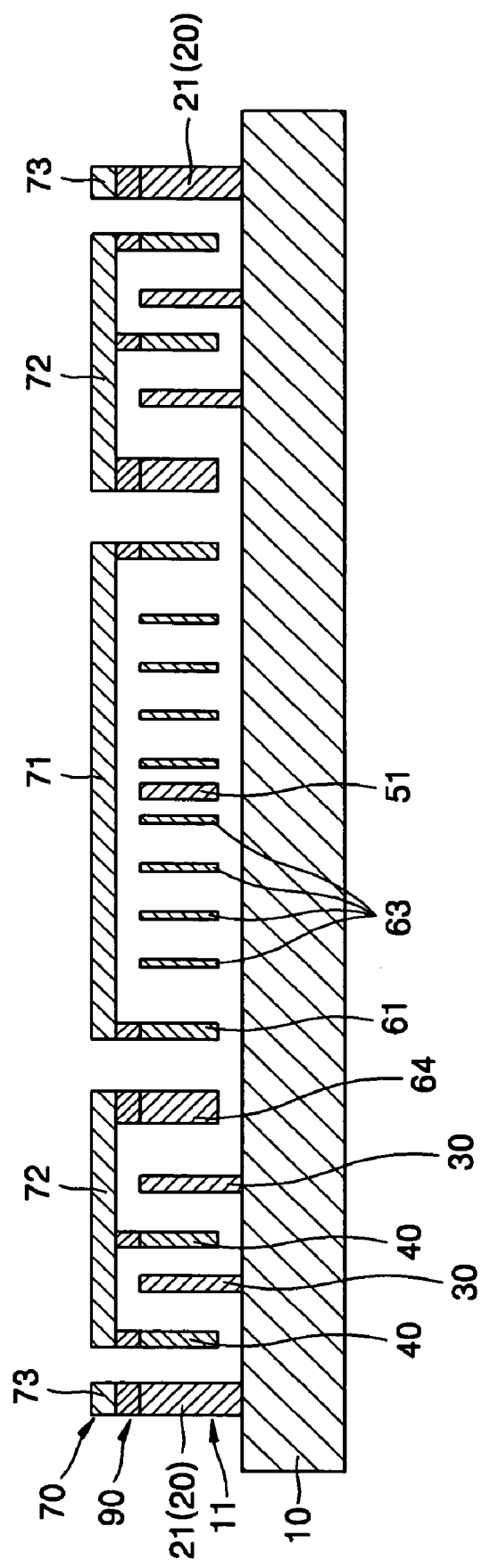
FIG. 3 is a cross-sectional view taken along the line A—A in FIG. 2 to show the connecting part and the stage part of the two-axis actuator of FIG. 1.

FIG. 1 is an exploded perspective view of a two-axis actuator according to a first exemplary embodiment of the present invention, FIG. 2 is a perspective plan view of the two-axis actuator of FIG. 1, and FIG. 3 is a cross-sectional view taken along the line A—A in FIG. 2 to show the connecting part and the stage part.

Referring to FIGS. 1 through 3, the two-axis actuator comprises a substrate 10; an actuating part 11, which includes a first actuating part that actuates in a first direction and a second actuating part that actuates in a second direction, orthogonal to the first direction; a stage part 70 that moves in the first and second directions and is connected to the actuating part 11; and a connecting part 90 disposed between the actuating part 11 and the stage part 70 and connecting the two parts. The actuating part 11 and the stage part 70 may be formed of a conductive material, and the connecting part may be formed of an insulating layer.

An anchor unit 20, which has approximately rectangular sides, including sides extending in the first direction which have a plurality of discrete portions, is disposed on the substrate 10.

The anchor unit 20 comprises the sides extending in the first direction and sides 21 extending in the second direction. The sides extending in the first direction include first portions 22, which extend inwardly along the first direction from ends of the sides 21, and second portions 23 disposed between the first portions 22 and extending in the first direction. The anchor unit 20 may be connected to the stage part 70 through the connecting part 90. An actuating part electrode pad 27 is provided at each side 21, and a fixed part electrode pad 28 is provided at each second portion 23.

First actuating parts and second actuating parts are disposed inside the anchor unit 20. The first actuating parts are formed in each region adjacent to the sides 21, and the second actuating parts are formed between the first actuating parts.

The first actuating parts comprise a plurality of first actuating frames 40 disposed in parallel to the sides 21 extending in the second direction, a plurality of fixed frames 30, disposed alternately with and parallel to the first actuating frames 40, first actuating comb electrodes 43 extending from the first actuating frames 40 toward the side 21 in the opposite direction, and first fixed comb electrodes 33, disposed alternately with the first actuating comb electrodes 43 extending from the first fixed frames 30.

The first actuating frames 40 are disposed a predetermined distance from the substrate 10, and an upper part of the first actuating frames 40 is connected to a third actuating part 72 in FIG. 4 which will be described later. Each end of the first actuating frames 40, adjacent to the sides 21 extending in the second direction is connected to the first portions 22 via first direction deformable springs 45. The first actuating frames 40 are connected to first actuating main frames 41 that connect the centers of the first actuating frames 40. The first actuating main frame 41 and a second actuating main frame 61 are connected by a second direction deformable spring 46.

First frames 31, electrically separated from the first portion 22 and the second portion 23, are interposed between the first portion 22 and the second portion 23. The ends of first fixed frames 30 are connected to both sides of the frame 31 for current flow. The first fixed frames 30 and the frame 31 are fixed on the substrate 10, but are separated a predetermined distance from the stage part 70. A fixed part electrode pad 38 is provided at each first frame 31.

The second actuating part is disposed a predetermined distance above from the substrate 10. The second actuating part comprises second fixed frames 50 disposed in parallel to the portions 23 in each region adjacent to the portions 23; second main frames 51 which connect the centers of the second fixed frames 50 and have ends which extend toward corresponding portions 23; first fixing beams 54 which are connected to the ends of the second main frames 51, and an upper part of each of which is connected to the third actuating part 72; second actuating frames 60 disposed alternately with and in parallel to the second fixed frames 50 at both sides of the second main frames 51; and third main frames 61 that connect the outer ends of the second actuating frames 60. Second actuating comb electrodes 63 extend from the second actuating frames 60 away from the corresponding portion 23, and second fixed comb electrodes 53 disposed alternately with and parallel to the second actuating comb electrodes 63 extend from the second fixed frames 50.

The second fixed frames 50 and the second main frames 51 are supported by the first fixing beams 54 fixed to the third actuating part 72. First direction deformable springs 55 are disposed between the first fixing beams 54 and the second portions 23.

The second actuating frames 60 are connected to the stage 71 (FIG. 4) in a stage part 70 through the connecting part 90 and are actuated in the second direction by an electrostatic force. Center parts of the third main frames 61 are connected through second direction deformable springs 46 to the first actuating main frame 41. Ends of the third main frames 61 are connected through second direction deformable springs 65 to the second fixing beams 64, which are connected to the third actuating part 72 of the stage part 70.

Figure 4:
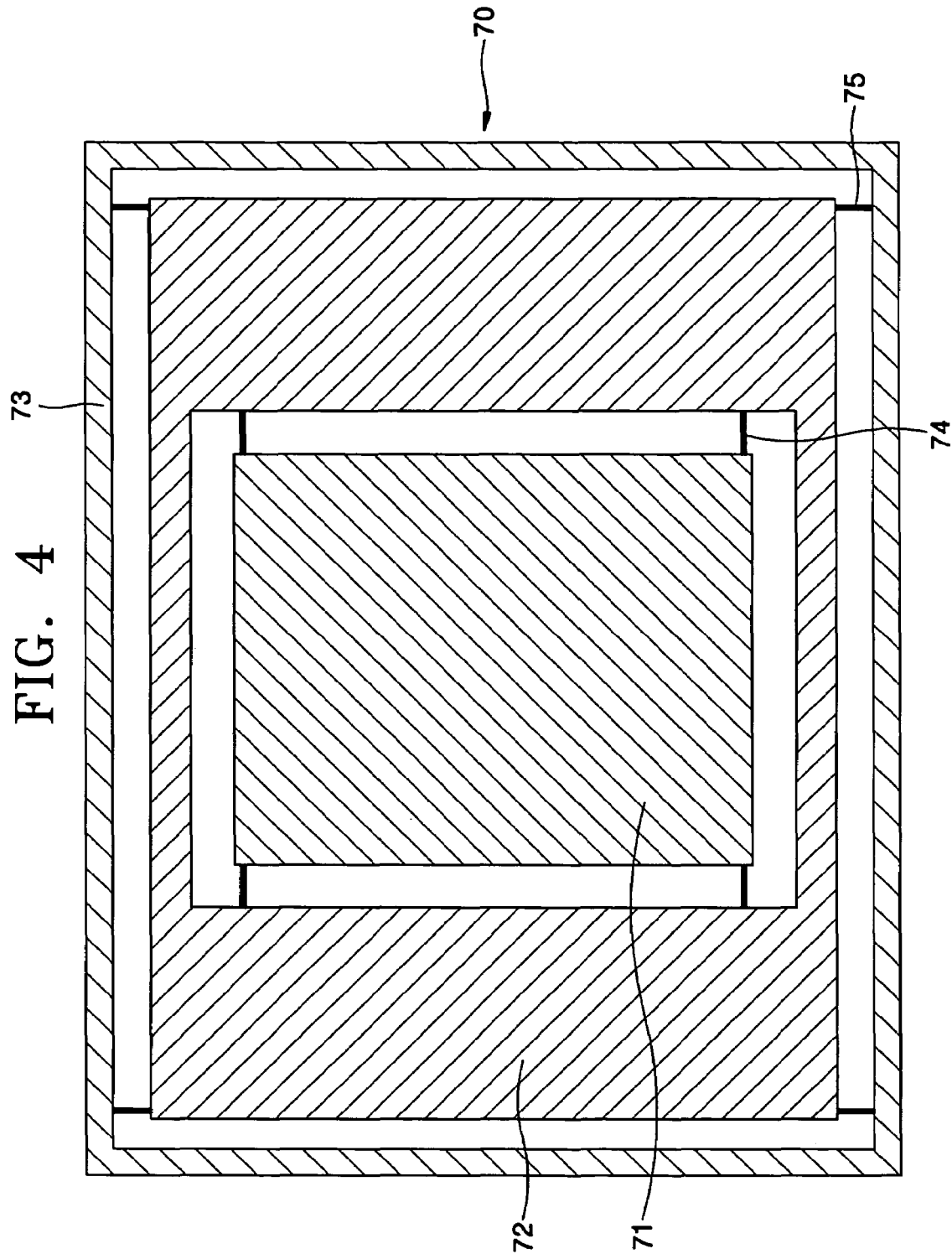
FIG. 4 is a plan view of the stage in FIG. 1.

FIG. 4 is a plan view of the stage part 70 in FIG. 1. Referring to FIG. 4, the stage part 70 comprises a stage 71 of a rectangular shape, actuated in the second direction by the second actuating part; a frame part 73 having sides of a rectangular shape on the anchor unit 20; and the third actuating part 72 which is connected to an upper part of the first actuating frames 60, and forms one-body by extending from both sides facing each other between the stage 71 and the frame part 73. Second direction deformable springs 74 are disposed between the stage 71 and the third actuating part 72, and first direction deformable springs 75 are disposed between the third actuating part 72 and the frame part 73. The stage 71 moves in the second direction by the movement of the second actuating frame 60 mounted below, and the third actuating part 72 moves in the first direction by the movement of the first actuating frame 40. Accordingly, the stage 71 can move in the first direction and in the second direction, that is, two-axis directions without coupling between the two axis.

Figure 5:
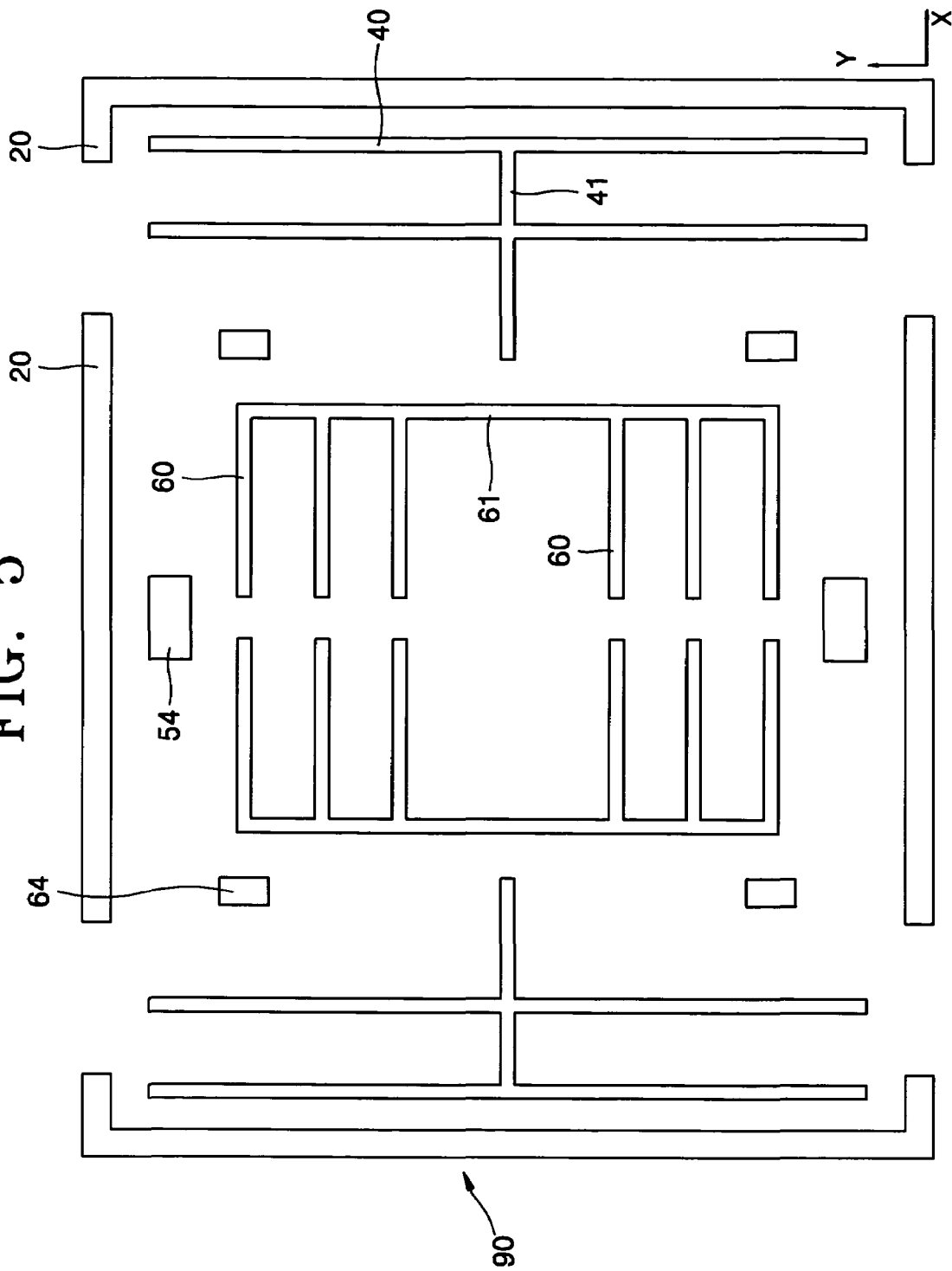
FIG. 5 is a plan view of the connector in FIG. 1.

FIG. 5 is a plan view of the connecting part 90 in FIG. 1. The connecting part 90 disposed between the actuating part 11 and the stage part 70, transmits an actuating force of the actuating part 11 to the stage part 70, and also serves as an insulator between the actuating part 11 and the stage part 70. Identical reference numerals are used for the actuating part 11 and the stage part 70.

Referring to FIG. 5, an anchor unit 20, first actuating frames 40, second actuating frames 60, first fixing beams 54, and second fixing beams 64 are connected to the stage part 70.

An electrostatic force resulting from a voltage difference between the actuating comb electrodes 43 and 63 and the fixed comb electrodes 33 and 53 is used to move the stage 71 in the X-Y directions on a plane.

An electrostatic force can be exerted in each of the actuating directions, that is, a positive X direction, a negative X direction, a positive Y direction, and a negative Y direction.

Figure 6:
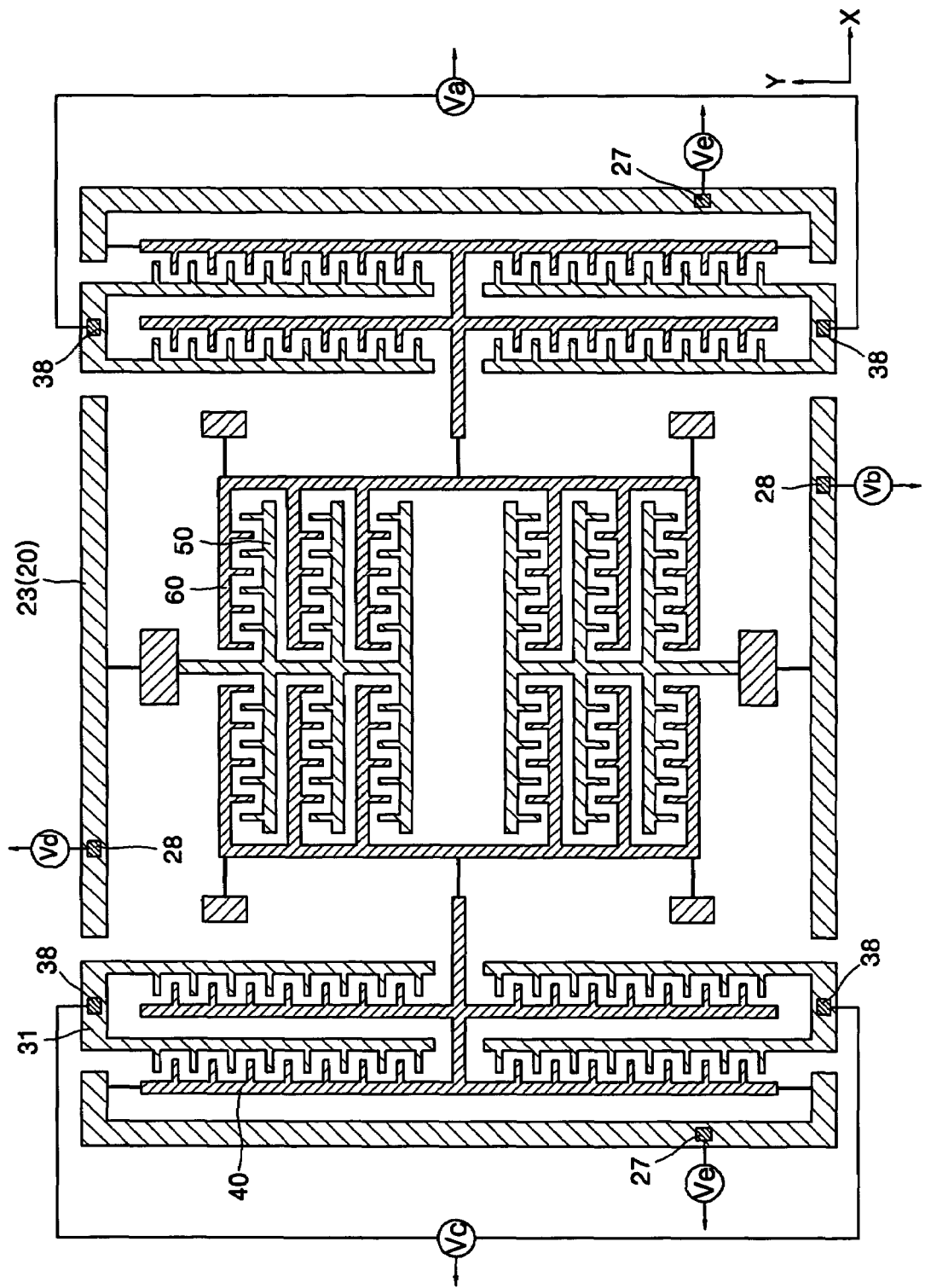
FIG. 6 is a plan view showing voltage application during an operation of the two-axis actuator according to the first exemplary embodiment of the present invention.

FIG. 6 is a plan view showing voltage application during an operation of the two-axis actuator according to the first embodiment of the present invention. Referring to FIG. 6, the first actuating frames 40, the second actuating frames 60, and the anchor unit 20 are electrically connected with one another. Electrode pads 27 for applying voltage to the first and second actuating frames 40 and 60 are formed at the sides 21 of the anchor unit 20. Also, electrode pads 38 are formed at each first frame 31, and an X axis actuating voltage Va or Vc is applied to two electrode pads 38. The second fixed frames 50 are electrically connected to the adjacent second portions 23 of the anchor unit 20, and the electrode pads 28 for applying a predetermined voltage to the corresponding second fixed frames 50 are formed at the second portions 23 of the anchor unit 20.

The magnitudes of the electrostatic forces are controlled by voltage differences between the voltages Va, Vb, Vc, and Vd applied to the electrode pads 28 and 38 and the voltage Ve applied to the actuating frame electrodes 27. The magnitudes of the electrostatic forces control a moving distance and direction of the stage 71.

Figure 7:
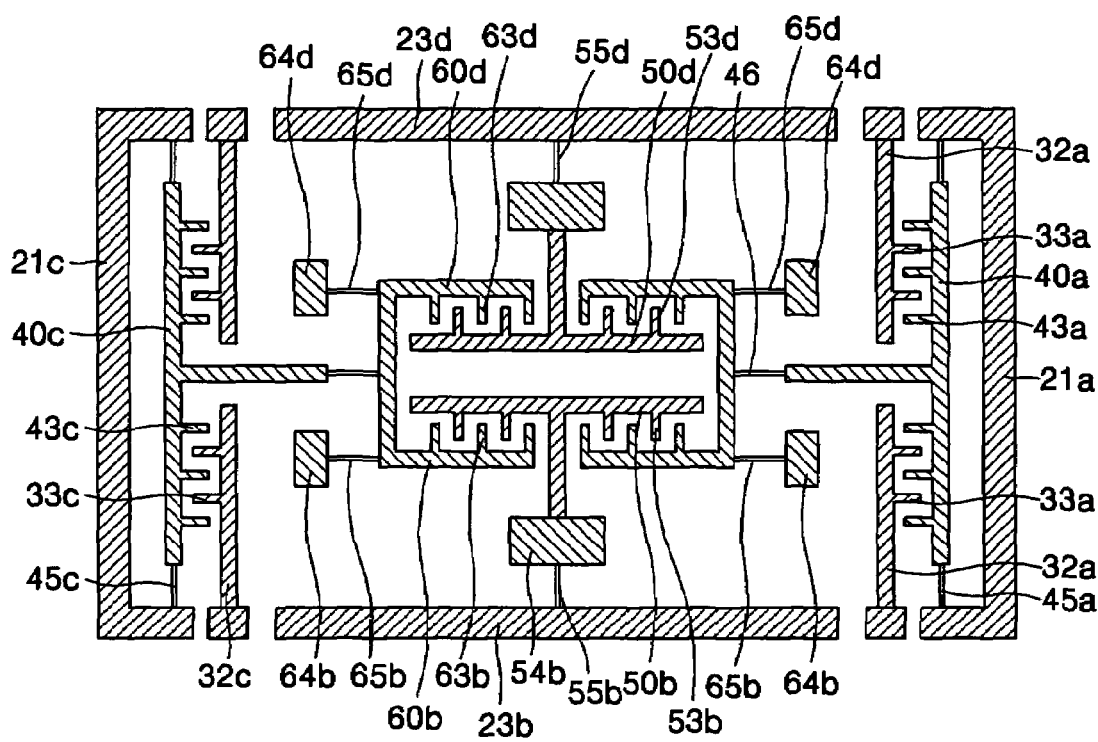
FIG. 7 is a simplified model diagram describing the principle of actuating a two-axis actuator according to the first exemplary embodiment of the present invention.
Figure 8:
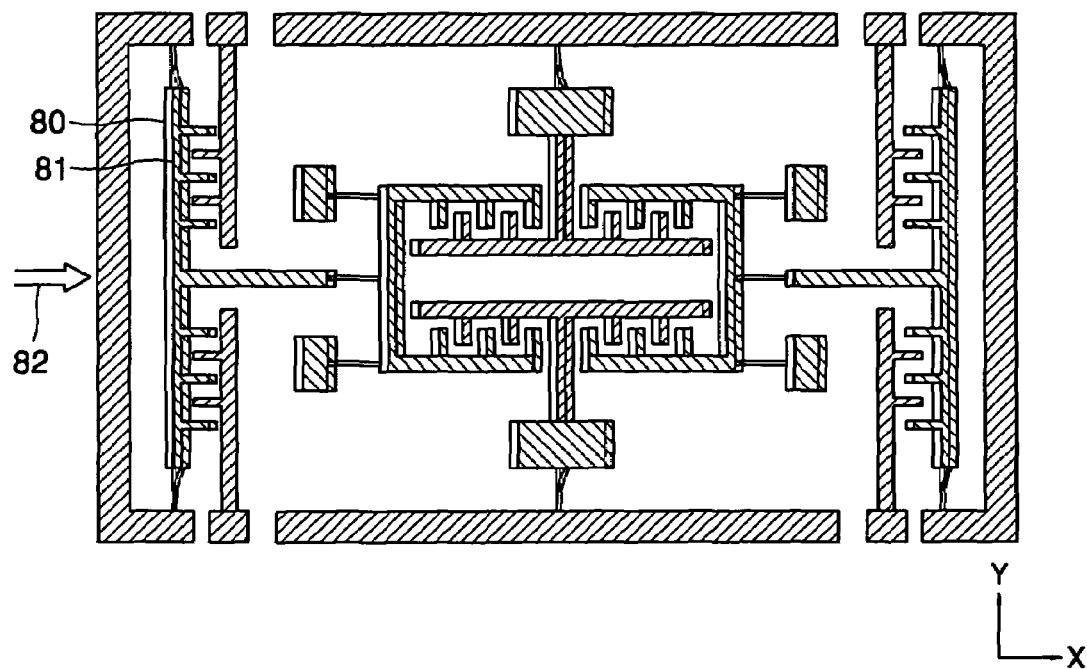
FIG. 8 is a simplified model diagram describing the principle of actuating the stage of the two-axis actuator of the first exemplary embodiment of the present invention in the positive X axis direction.

FIG. 7 is a simplified model diagram describing the principle of actuating a two-axis actuator according to the first embodiment of the present invention. FIG. 8 is a simplified model diagram describing the principle of actuating the stage of the two-axis actuator of the first embodiment of the present invention in the positive X axis direction.

Referring to FIGS. 7 and 8, in case of actuating the stage 71 in the positive X direction, the first actuating frame 40c moves in the positive X direction by an electrostatic force 82 generated by the voltage difference between the fixed comb electrodes 33c and the actuating comb electrodes 43c positioned in the negative X direction. At this time, since the third actuating part 72 is connected to the first actuating frames 40, the first fixing beams 54, and the second fixing beams 64 move in the positive X direction, the first direction deformable springs 45a, 45c, 55b, and 55d and the first direction deformable springs 75 of the stage part 70 are deformed in the X direction. This enables the first actuating frame 40 and the third actuating part 72 to move in the positive X direction. The second direction deformable springs 65b, 65d, and 46 and the second direction deformable spring 74 of the stage part 70 are moved in the positive X direction without deformation. However, a tension force is exerted because the springs 65b, 65d, 46 and 74 are arranged in parallel to the X direction. Accordingly, the stage 71 moves in the direction of the first actuating frames 40. Reference numeral 80 in FIG. 8 indicates before deforming in the positive X direction, and reference numeral 81 indicates after deforming in the positive X direction.

Figure 9:
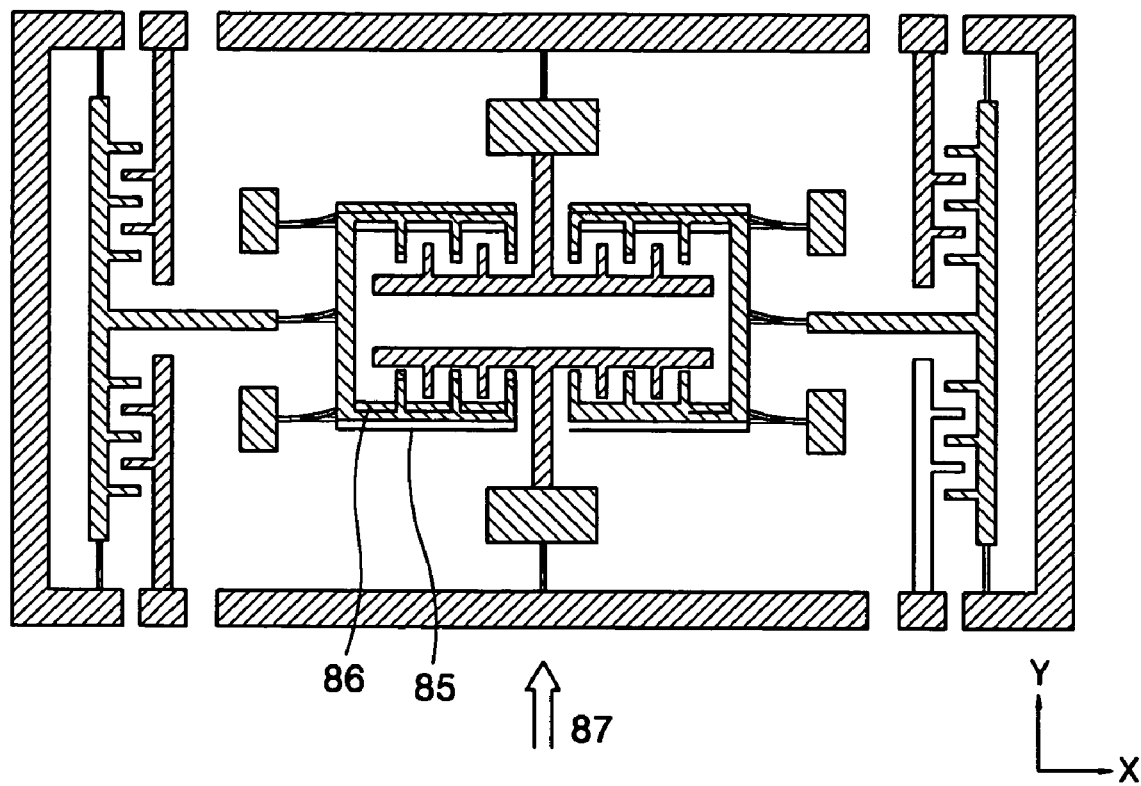
FIG. 9 is a simplified model diagram describing the principle of actuating the stage of the two-axis actuator of the first exemplary embodiment of the present invention in the positive Y axis direction.

FIG. 9 shows a simple model diagram describing the principle of actuating the stage of the two-axis actuator of the first embodiment of the present invention in the positive Y axis direction.

Referring to FIGS. 7 and 9, the second actuating frames 60b move in the positive Y direction by the electrostatic force 87 generated by a voltage difference between the actuating comb electrodes 63b and the fixed comb electrodes 53b in the negative Y direction. At this time, since the stage 71 is connected to the second actuating frame 60b, both moving in the positive Y direction, the second direction deformable springs 65b, 65d, and 46 and the second direction deformable spring 74 of the stage part 70 are deformed to enable the second actuating frame 60b and the stage 71 to move in the positive Y direction. The first direction deformable springs 45a, 45c, 55b, and 55d and the first direction deformable spring 75 of the stage part 70 remain at the same location without movement regardless of the movement of the second actuating frame 60 and the stage 71. Reference numeral 85 in FIG. 9 indicates before deforming in the positive Y direction, and reference numeral 86 indicates after deforming in the positive Y direction.

When the electrostatic forces 82 and 87 for actuating the stage are exerted at the same time, the stage 71, while moving in the Y direction, also moves in the positive X direction by the X direction movement of the third actuating part 72. Therefore, the stage 71 is actuated in two axes. The detailed description of actuating in two directions is omitted because the principle of actuating in two directions is simply a combination of the movement in the X and Y directions.

Figure 10:
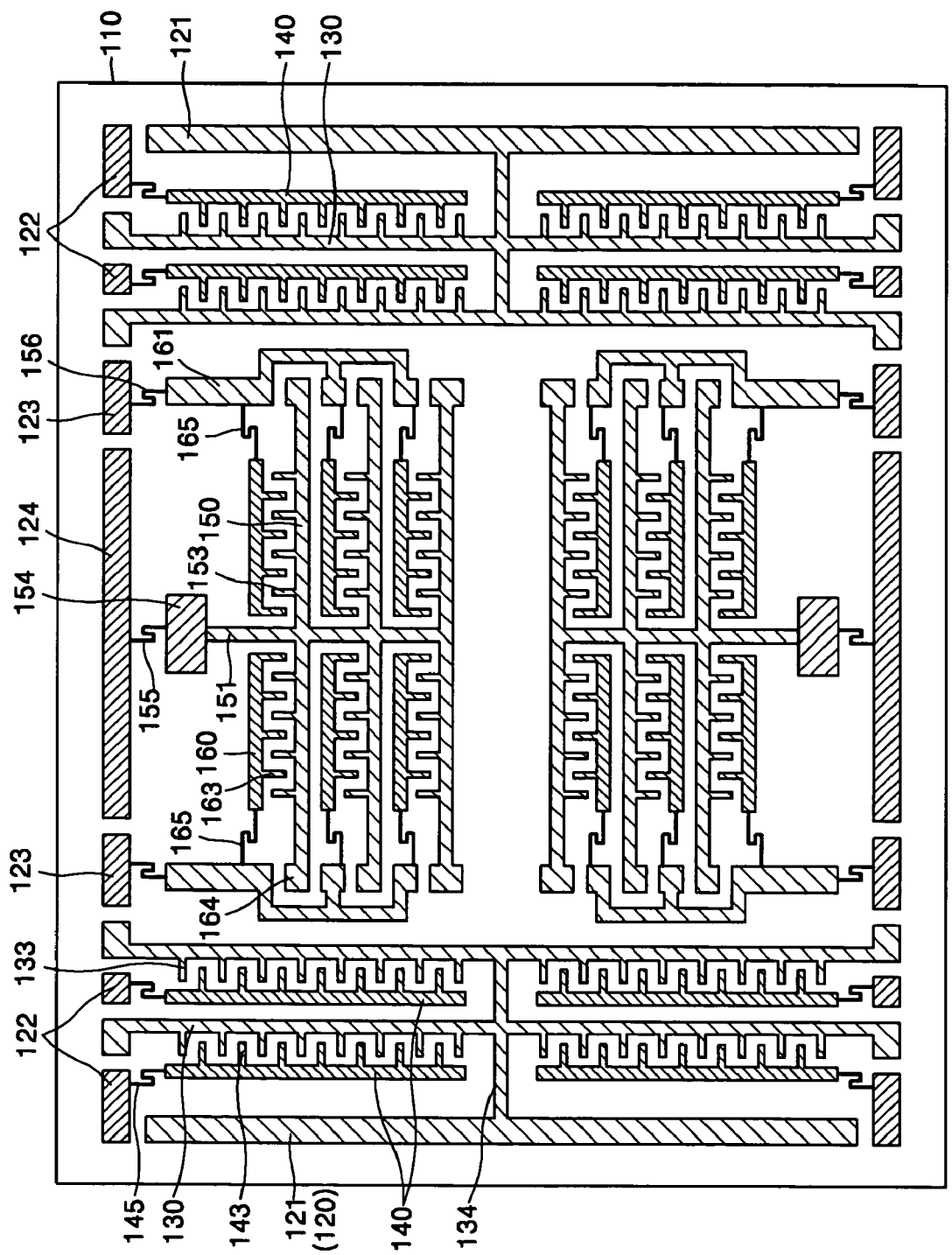
FIG. 10 is a plan view of an actuating part of a two-axis actuator according to a second exemplary embodiment of the present invention.
Figure 11:
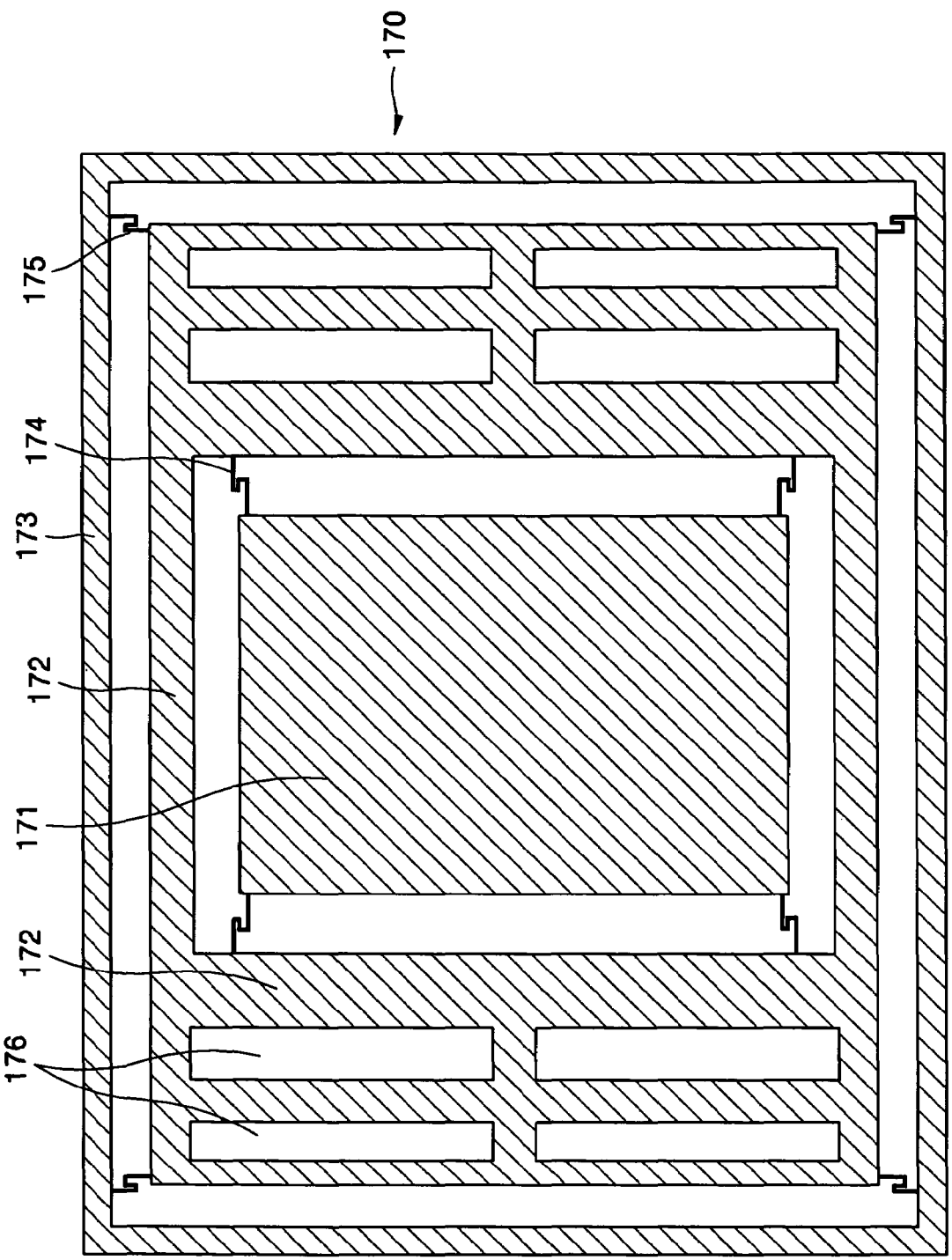
FIG. 11 is a plan view of a stage according to a second exemplary embodiment of the present invention.

FIG. 10 is a plan view of an actuating part of a two-axis actuator according to a second exemplary embodiment of the present invention, and FIG. 11 is a plan view of the stage according to a second exemplary embodiment of the present invention.

Referring to FIGS. 10 and 11, a two-axis actuator comprises a substrate 110; an actuating part that includes a first actuating part which moves in the first direction and a second actuating part which moves in the second direction orthogonal to the first direction; a stage part 170 that moves in two axial directions in connection with the actuating part, and a connecting part (not shown) that connects the actuating part and the stage part 170 and is disposed therebetween. The actuating part and the stage part 170 may be formed of a conductive material, and the connecting part may be an insulating layer. The connecting part is very similar to the connecting part in FIGS. 1 and 5, therefore, a detailed drawing and description are omitted.

An anchor unit 120 having approximately rectangular sides is disposed on the substrate. The anchor unit 120 comprises sides extending in the first direction and sides 121 extending in the second direction. The sides of the anchor unit 120 extending in the first direction include first portions 122, second portions 123, and third portions 124, disposed at predetermined distances from each other.

Within the frame formed by the anchor unit 120, first actuating portions and second actuating portions are formed. The first actuating portions are formed in a region adjacent to the sides 121, and the second actuating parts are disposed in a region adjacent to the portions 124, and between the first actuating parts.

The first actuating parts comprise a plurality of first actuating frames 140 disposed parallel to the sides 121 in the second direction; a plurality of fixed frames 130 alternately disposed parallel to the first actuating frames 140; first actuating comb electrodes 143 extending from the first actuating frame 140; and first fixed comb electrodes 133 alternately disposed with the first actuating comb electrodes 143, and extending from the first fixed frames 130.

The first fixed frame 130 is fixed on the substrate 110 and is separate from the stage 170 disposed thereabove. The first fixed frames 130, disposed in each side, are connected to the sides 121 through the first main frame 134 that inter-connects centers of the first fixed frames 130. The first actuating frames 140 are disposed on both sides of the first main frame 134.

The first actuating frames 140 are disposed a predetermined distance from the substrate 110, and an upper part of each of the first actuating frames 140 is connected to a third actuating part 172 in FIG. 11, which will be described later, through the connecting part. An end of each of the first actuating frames 140 is connected to the adjacent first portion 122 by a first direction deformable spring 145.

The second actuating part is disposed a predetermined distance from the substrate 110. The second actuating part comprises second fixed frames 150, disposed parallel and adjacent to the portions 124; second main frames 151 that connect centers of the second fixed frames 150 and ends of which are extended toward the corresponding portions 124; first fixing beam 154, which are connected to the ends of the second main frames 151 and an upper part of each of which is connected to the third actuating part 172; second actuating frames 160 disposed alternately with and parallel to the second fixed frames 150 at the both sides of the second main frames 151; and third main frames 161 that connect outer ends of the second actuating frames 160 via the second direction deformable springs 165. Second actuating comb electrodes 163 extend from the second actuating frames 160 away from the corresponding portion 124, and second fixed comb electrodes 153 extend from the second fixed frames 150 and are disposed alternately with and parallel to the second actuating comb electrodes 163.

Second fixing beams 164 are installed at both ends of the second fixed frames 150. The second fixing beams 164 are connected to and fixed by the third actuating part 172.

The third main frames 161, upper parts of which are connected to the third actuating part 172, support the second actuating frames 160 and are actuated in the first direction by means of the ends of the third main frames 161 which are connected to second portions 123 of the anchor unit 120 by first direction deformable springs 156.

The second fixed frames 150 and the second main frames 151 are fixed by the first fixing beams 154 and the second fixing beams 164, which are fixed by the third actuating part 172. First direction deformable springs 155 may be disposed between the first fixing beams 154 and the third parts 124.

The second actuating frames 160 are connected to the stage 171 of the stage part 170 via the connecting part, and are moved in the second direction by an electrostatic force.

Referring to FIG. 11, the stage part 170 comprises a rectangular shaped stage 171 that is moved in the second direction by the second actuating parts; a frame part 173 that has sides of a rectangular shape disposed above the anchor unit 120; and the third actuating part 172 which surrounds the stage 171 and is disposed above the second actuating frames 160 of the second actuating parts. Second direction deformable springs 174 that connect the stage 171 and the third actuating part 172 are disposed therebetween, and first direction deformable springs 175 that connect the third actuating part 172 and the frame part 173 are disposed therebetween. The stage 171 moves in the second direction by the movement of the second actuating frame 160 mounted below, and the third actuating part 172 moves in the first direction by the movement of the first actuating frame 140. Accordingly, the stage 171 can move in the first direction and in the second direction, that is two axis directions, without coupling between the two axis.

The deformable springs may be formed in an S shape or may be folded.

The weight of the stage 170 can be reduced by forming a plurality of openings 176 at the third actuating part 172, thereby increasing natural frequency. The stage can be moved linearly by employing the folded springs.

To move the stage 171 in the X-Y direction on a plane, an electrostatic force resulting from a voltage difference between the actuating comb electrodes 143 and 163 and the fixed comb electrodes 133 and 153, is used. The principle of actuating the stage 171 is practically the same as described in the first embodiment of the present invention. Therefore, the detailed description about the actuation of the stage 171 is omitted.

As described above, a probe in the micro-actuator according to the present invention always approaches the same position on a medium. For the probe to read or write new information from or to the medium, the location of the medium must be changed relative to the position approached by the probe, and this change can be achieved through the use of a stage of a micro-actuator on which the medium is mounted. That is, the input/output of data is controlled by the probe, while the position at which data is stored is determined by the stage micro-actuator. The stage micro-actuator is capable of moving the medium in two degrees of freedom on the same plane.

The micro-actuator according to the present invention can be realized on a silicon wafer by using micro-electromechanical system (MEMS) techniques. Also, the micro-actuator is capable of actuating by an electrostatic force of a comb type structure.

A micro-actuator according to the present invention is an X-Y stage micro-actuator for a storage device, that remarkably increases the stage area (storage area) by forming the stage separately on the actuator, and removes inter axis coupling when moving X axis and Y axis.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A two-axis actuator comprising:
 a substrate;
 an anchor unit fixed on the substrate, the anchor unit comprising approximately rectangular sides, including first sides facing each other and extending in a first direction, the first sides having a plurality of corresponding discrete portions;
 first actuating parts disposed in regions adjacent to second sides of the anchor unit extending in a second direction orthogonal to the first direction, the first actuating parts moveable in the first direction;
 second actuating parts disposed a predetermined distance above the substrate and formed between the first actuating parts in a region adjacent to the first sides of the anchor unit extending in the first direction, the second actuating parts moveable in the second direction;
 a stage of a rectangular shape disposed on the second actuating parts so as to be movable in the second direction;
 a third actuating part separately disposed between the stage and the anchor unit, wherein the third actuating part is disposed on the first actuating parts as one body to move the stage in the first direction by a movement of the first actuating parts;
 first direction deformable springs disposed at inner faces of the anchor unit for enabling the first actuating parts to move in the first direction; and
 second deformable springs disposed at inner faces of the third actuating part for enabling the second actuating parts to move in the second direction.

2. The two-axis actuator of claim 1, wherein the first actuating part comprises:
 a plurality of first actuating frames disposed at a predetermined distance above the substrate, wherein upper parts of the first actuating frames are connected to the third actuating part, and the first actuating frames are disposed in parallel to the second sides of the anchor unit extending in the second direction;
 a plurality of first fixed frames disposed alternately with and parallel to the first actuating frames;
 a plurality of first actuating comb electrodes extending from the first actuating frames toward corresponding first fixed frames; and
 a plurality of first fixed comb electrodes disposed alternately with and parallel to the actuating comb electrodes and extending from the first fixed frames.

3. The two-axis actuator of claim 2, wherein the first direction deformable springs connect the ends of the first actuating frames to the first sides of the anchor unit extending in the first direction.

4. The two-axis actuator of claim 2, wherein the first direction deformable springs connect the first sides of the anchor unit extending in the first direction to outer sides of the third actuating part.

5. The two-axis actuator of claim 2, further comprising first main frames connecting centers of the first actuating frames adjacent to the second sides of the anchor unit extending in the second direction, wherein the first fixed frames are disposed on both sides of the first main frames.

6. The two-axis actuator of claim 5, wherein the second actuating part comprises:
 a plurality of second fixed frames disposed in parallel to the first sides of the anchor extending in the first direction;
 second main frames connecting centers of the second fixed frames, wherein an end of each of the second main frames is extended toward the first sides of the anchor unit extending in the first direction;
 first fixing beams connected to ends of the second main frame, wherein an upper part of each of the first fixing beams is connected to the third actuating part;
 a plurality of second actuating frames disposed alternately with and in parallel to the second fixed frames on both sides of the second main frames, wherein an upper part of each of the second actuating frames is connected to the stage;
 third main frames, connected to outer ends of the second actuating frames;
 a plurality of second actuating comb electrodes extending from the second actuating frames toward the second fixed frames; and
 a plurality of fixed comb electrodes extending from the second fixed frames and disposed alternately with and in parallel to the second actuating comb electrodes.

7. The two-axis actuator of claim 6 wherein the second direction deformable springs are disposed between the stage and the third actuating part.

8. The two-axis actuator of claim 6, further comprising second fixing beams disposed at a predetermined distance outward from the third main frames, wherein an upper part of each of the second fixing beams is connected to the third actuating part, and the second direction deformable springs are disposed between the second fixing beams and the third main frames.

9. The two-axis actuator of claim 6, further comprising first direction deformable springs disposed between the first fixing beams and the corresponding first sides of the anchor unit extending in the first direction.

10. The two-axis actuator of claim 6, further comprising second direction deformable springs to connect ends of the first main frames to the third main frames.

11. The two-axis actuator of claim 1, wherein a plurality of openings are formed in the third actuating part.

12. The two-axis actuator of claim 1, wherein the first actuating part comprises:
- a plurality of first fixed frames disposed on the substrate in parallel to the second sides of the anchor unit extending in the second direction;
- a plurality of first actuating frames disposed at a predetermined distance above the substrate, wherein upper parts of the first actuating frames are connected to the third actuating part, and the first actuating frames are disposed alternately with and in parallel to the first fixed frames;
- a plurality of actuating comb electrodes extending from the first actuating frames toward the first fixed frames; and
- a plurality of fixed comb electrodes disposed alternately with and in parallel to the actuating comb electrodes extending from the first fixed frames.

13. The two-axis actuator of claim 12, wherein the first direction deformable springs connect ends of the first actuating frames to the first sides of the anchor unit extending in the first direction.

14. The two-axis actuator of claim 12, wherein the first direction deformable springs connect the first sides of the anchor unit extending in the first direction to outer sides of the third actuating part.

15. The two-axis actuator of claim 12, further comprising first main frames connecting centers of the first fixed frames, wherein the first actuating frames are disposed on both sides of the first main frames.

16. The two-axis actuator of claim 15, wherein the second actuating part comprises:
- a plurality of second fixed frames disposed in parallel to the first sides of the anchor unit extending in the first direction;
- second main frames connecting centers of the second fixed frames, and wherein an end of each of the second main frames is extended toward the first sides of the anchor unit extending in the first direction;
- first fixing beams connected to ends of the second main frames, wherein an upper part of each of first fixing beams is connected to the third actuating part;
- a plurality of second actuating frames disposed alternately with and in parallel to the second fixed frames on both sides of the second main frames, wherein an upper part of each of the second actuating frames is connected to the stage;
- third main frames extending in the second direction and separated at a predetermined distance from the outer ends of the second actuating frames, wherein an upper part of each of the third main frames is connected to the third actuating part;
- a plurality of second actuating comb electrodes extending from the second actuating frames toward the second fixed frames; and
- a plurality of second fixed comb electrodes disposed alternately with and in parallel to the second actuating comb electrodes and extending from the second fixed frames.

17. The two-axis actuator of claim 16, further comprising second fixing beams connected to outer ends of the second fixed frames under the third actuating part.

18. The two-axis actuator of claim 16, wherein the second direction deformable springs are disposed between the stage and the third actuating part.

19. The two-axis actuator of claim 16, wherein the second direction deformable springs connect ends of the second actuating frames facing the second sides of the anchor unit extending in the second direction to corresponding sides of the third main frame.

20. The two-axis actuator of claim 16, further comprising first direction deformable springs disposed between ends of the third main frames and the first sides of the anchor unit extending in the first direction.

21. The two-axis actuator of claim 12, wherein a plurality of openings are formed in the third actuating part.

* * * * *